United States Patent
Ehrman et al.

(10) Patent No.: US 6,995,235 B1
(45) Date of Patent: Feb. 7, 2006

(54) METHODS OF PRODUCING POLYOLEFINS AND FILMS THEREFROM

(75) Inventors: Fred D. Ehrman, Houston, TX (US); Rainer Kolb, Kingwood, TX (US); Chi-I Kuo, Humble, TX (US); Porter C. Shannon, Seabrook, TX (US); Keith W. Trapp, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/120,008

(22) Filed: May 2, 2005

(51) Int. Cl.
*C08J 5/18* (2006.01)

(52) U.S. Cl. .................. 528/502 R; 526/114; 526/153; 526/352; 526/901; 526/919

(58) Field of Classification Search .......... 526/352, 526/114, 153, 901, 919; 528/502 R
See application file for complete search history.

(56) References Cited

U.S. PATENT DOCUMENTS

| | | | |
|---|---|---|---|
| 4,287,327 A | 9/1981 | Michaels et al. | 526/86 |
| 4,665,143 A | 5/1987 | Ahluwalia et al. | 526/88 |
| 5,290,745 A | 3/1994 | Jorgensen et al. | 502/109 |
| 5,541,270 A | 7/1996 | Chinh et al. | 526/68 |
| 6,306,981 B1 | 10/2001 | Brown et al. | 526/68 |
| 6,878,454 B1 * | 4/2005 | Shannon et al. | 428/523 |

* cited by examiner

*Primary Examiner*—Fred Teskin
(74) *Attorney, Agent, or Firm*—Kevin M. Faulkner (57) ABSTRACT

Films and methods of forming films comprising first combining in a reactor olefins, a catalyst composition and an activator; wherein the activator is present from less than 50 wt % in a diluent by weight of the activator and diluent; followed by isolating a polyolefin having a density of from 0.940 to 0.980 g/cm$^3$; and finally, extruding the polyolefin into a film having a gel count of less than 200 gels/m$^2$.

18 Claims, 1 Drawing Sheet

METHODS OF PRODUCING POLYOLEFINS AND FILMS THEREFROM

FIELD OF THE INVENTION

The present invention relates to a process for producing a high density polyolefin and films therefrom wherein the films have improved appearance, and in particular, a fluidized bed gas phase process of producing bimodal high density polyolefins and films therefrom using a catalyst composition employing a separate feed of activator to the reactor.

BACKGROUND OF THE INVENTION

Films extruded from high density polyolefins, especially high density polyethylenes, have become an important product worldwide. Even more particularly, the use of multimodal or bimodal polyethylenes in films has gained market share over traditional unimodal polyethylenes. An example of producing high density films can be found in U.S. Pat. No. 6,878,454. In order to make such films, complex reaction processes such as the use of multi-site catalysts and/or multi-stage reactors are necessary. This can often lead to problems in the quality of the film, such as the presence of gels. The formation of gels in films is well known in the art and can be characterized as highly localized imperfections in the film that are visually distinct from the surrounding film, mostly due to the presence of either high concentrations of unblended polymer, unreacted catalyst and activator, or both, but can include other types of visually distinct imperfections as well. The presence of gels lowers the value of these films, and in some cases makes the films unmarketable.

It has been found by the inventors that the way in which the activator is added to the reactor can influence the final properties of the polyolefin that is produced in the reactor, and the films extruded therefrom. There have been various disclosures that describe alternative means of adding catalyst components such as the catalyst activator to polymerization reactors, such as in U.S. Pat. No. 4,287,327, U.S. Pat. No. 4,665,143, U.S. Pat. No. 5,290,745, U.S. Pat. No. 5,541,270 and U.S. Pat. No. 6,306,981. To date, there has been no solution to the problem of improving the properties of the films generated from high density polyolefins. The present invention is directed to an improved method of forming films from high density polyolefins.

SUMMARY OF THE INVENTION

In one embodiment, the present invention is a method of forming a film comprising:
(a) combining in a reactor olefins, a catalyst composition and an activator; wherein the activator is present from less than 50 wt % in a diluent by weight of the activator and diluent;
(b) isolating a polyolefin having a density of from 0.940 to 0.980 g/cm$^3$; and
(c) extruding the polyolefin into a film having a gel count of less than 200 gels/m$^2$.

In another embodiment, the diluent is selected from the group consisting of C$_3$ to C$_{20}$ alkanes, C$_3$ to C$_{20}$ alkenes and combinations thereof.

In yet another embodiment, the catalyst composition comprises a support and one or more catalyst compounds.

In yet another embodiment, the one or more catalyst compounds are selected from the group consisting of metallocenes, chromium compounds, Ziegler-Natta compounds, Group 4–10 coordination compounds, and combinations thereof.

In yet another embodiment, the one or more catalyst compounds comprise a metallocene and a Ziegler-Natta compound to form a bimetallic catalyst composition; and wherein these catalyst compounds are associated with a support material and an alumoxane.

In yet another embodiment, the reactor is a gas phase fluidized bed reactor, preferably a single gas phase reactor.

DETAILED DESCRIPTION OF THE INVENTION

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

The methods of the invention are directed to production of a polyolefin, isolating the polyolefin produced therefrom, and forming a film from that polyolefin having improved appearance as determined by the number of gels present. This is achieved by the introduction into the reactor of an activator ("secondary activator") that is dissolved or suspended in a diluent such that its concentration is advantageously low. The method of producing the polyolefin is not limited to any particular method and can include such methods known commonly as slurry polymerization, solution polymerization, gas phase polymerization, and any combination of these in a single stage or two or more stages. In one embodiment, the method of producing the polyolefin is a fluidized bed gas phase process as is well known in the art and described in, for example, WO 03/044061.

In an embodiment of a fluidized bed reactor, a monomer stream is passed to a polymerization section. As an illustration of the polymerization section, there can be included a reactor in fluid communication with one or more discharge tanks, surge tanks, purge tanks, and recycle compressors. In one or more embodiments, the reactor includes a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and at least one other α-olefin, and may also include "condensing agents" as is known in the art and disclosed in, for example, U.S. Pat. No. 4,543,399, U.S. Pat. No. 5,405,922, and U.S. Pat. No. 5,462,999.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity.

Ordinarily, the superficial gas velocity does not exceed 5.0 ft/sec and usually no more than 2.5 ft/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. That gas exiting the overhead of the reactor is the recycle gas stream.

The recycle stream is compressed in a compressor and then passed through a heat exchange zone where heat is removed before it is returned to the bed. The heat exchange zone is typically a heat exchanger which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. No. 4,933,149 and U.S. Pat. No. 6,627,713.

The catalyst composition used in the fluidized bed is preferably stored for service in a reservoir under a blanket of a gas which is inert to the stored material, such as nitrogen or argon. The activator compound may be added to the reaction system, or reactor, at any point and by any suitable means, and is preferably added to the reaction system either directly into the fluidized bed or downstream of the last heat exchanger (the exchanger farthest downstream relative to the flow) in the recycle line, in which case the activator is fed into the bed or recycle line from a dispenser. Preferably, the catalyst composition and activator ("secondary activator") are added to the reactor separately, regardless of the polymerization method used, that is, they are not allowed to contact one another until they enter the reactor, at which stage they may contact one another through diffusion of the substances and/or mixing of the components due to the flow of gasses through the bed. The activator/diluent may be added into the reactor in one or more locations, one location in a particular embodiment. The catalyst composition is injected into the bed at a point above distributor plate. Preferably, the catalyst composition is injected at a point in the bed where good mixing with polymer particles occurs. Injecting the catalyst composition at a point above the distribution plate provides satisfactory operation of a fluidized bed polymerization reactor.

More particularly, the olefins, catalyst composition and an activator are combined in the reactor, wherein the activator is present from less than 50 wt % in a diluent by weight of the activator and diluent. The minimum concentration of activator in the diluent is that which is sufficient to effectuate the production of polyolefin product under the given reactor conditions, that polyolefin product detectable by techniques common in the art. The minimum concentration of activator in the diluent can also range from greater than 0.001 wt % in one embodiment and from greater than 0.05 wt % in another embodiment, and from greater than 0.1 wt % in yet another embodiment. The maximum concentration of activator in the diluent can also be less than 40 wt % in another embodiment, and less than 30 wt % in yet another embodiment, and less than 20 wt % in yet another embodiment, and less than 10.5 wt % in yet another embodiment. A desirable concentration range of activator in diluent can be described by any combination of any upper limit with any lower limit described herein.

Preferably, the activator is added to the reactor as a solution/slurry with the diluent, combined prior to injection into the reactor. Optionally, the diluent and activator may be combined just before entering the reactor, the activator stored initially as a concentrated or pure solution or solid separate from the diluent.

This activator ("secondary activator") is selected from the group consisting of compounds having the formula $R_3M'$, wherein M' is a Group 13 metal atom, and each R is independently selected from halides, hydride, $C_1$ to $C_{10}$ alkyls, $C_1$ to $C_{10}$ alkoxys, $C_5$ to $C_{24}$ aryls, $C_5$ to $C_{24}$ aryloxys and combinations thereof. In a preferred embodiment, M' is aluminum or boron, more preferably aluminum. In a most preferred embodiment, the activator is trimethylaluminum.

The "diluent" can be any suitable substance that is a liquid at the temperature and pressure at which the activator is added to the reactor, preferably selected from the group consisting of $C_3$ to $C_{20}$ alkanes, $C_3$ to $C_{20}$ alkenes and combinations thereof. In one embodiment, the $C_3$ to $C_{20}$ alkenes are the comonomer that is used in the polymerization process of the invention. Non-limiting examples of suitable diluents include isopentane, hexane, 1-butene and 1-hexene. The activator may be dissolved completely, may be a suspension, or some state in between. Preferably, a diluent is chosen such that the activator is dissolved.

The activator that is separately combined in the reactor with the olefins and catalyst composition is maintained in the reactor at a concentration of from 25 to 350 wt ppm in one embodiment, and from 50 to 200 wt ppm in another embodiment, and from 80 to 130 wt ppm in yet another embodiment, wherein the "wt ppm" refers to the parts per million of activator fed with respect to the weight of the primary monomer fed to the reactor, which in one embodiment is ethylene. It will be understood that the catalyst composition may comprise one or more other catalyst "activators". Those activators associated with the catalyst composition ("primary activator(s)"), if present, are distinct from the activators ("secondary activators") otherwise referred to herein in that they are added separately.

The monomers can be introduced into the polymerization zone in various ways including direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of polyolefin may be conveniently controlled by adjusting the rate of catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particular polymer formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas-phase reactor embodiment, the reactor temperature of the fluidized bed process herein ranges from 70° C. or 75° C. or 80° C. to 90° C. or 95° C. or 100° C. or 110° C., wherein a desirable temperature range comprises any upper temperature limit combined with any lower temperature limit described herein. In general, the reactor temperature is operated at the highest temperature that is feasible, taking into account the sintering temperature of the polyolefin product within the reactor and fouling that may occur in the reactor or recycle line(s).

In the fluidized bed gas-phase reactor embodiment, the gas phase reactor pressure, wherein gases may comprise hydrogen, ethylene and higher comonomers, and other gases, is between 1 (101 kPa) and 100 atm (10,132 kPa) in one embodiment, and between 5 (506 kPa) and 50 atm (5066 kPa) in another embodiment, and between 10 (1013 kPa) and 40 atm (4050 kPa) in yet another embodiment.

The process of the present invention is suitable for the production of homopolymers comprising ethylene derived units, and/or copolymers comprising ethylene derived units and at least one or more other olefin(s) derived units. Preferably, ethylene is copolymerized with α-olefins containing from 3 to 12 carbon atoms in one embodiment, and from 4 to 10 carbon atoms in yet another embodiment, and from 4 to 8 carbon atoms in a preferable embodiment. Even more preferably, ethylene is copolymerized with 1-butene or 1-hexene to form the polyolefin useful for the films of the invention.

The comonomer may be present at any level that will achieve the desired weight percent incorporation of the comonomer into the finished resin. In one embodiment of polyolefin production, the comonomer is present with ethylene in the circulating gas stream in a mole ratio range of from 0.0005 (comonomer:ethylene) to 0.100, and from 0.0010 to 0.050 in another embodiment, and from 0.005 to 0.030 in yet another embodiment.

Granules of polyolefin material are formed from the processes described herein in making the polyolefin composition. The polyolefins described herein are multimodal or bimodal in one embodiment, preferably bimodal, and comprise at least one high molecular weight component (HMW), preferably a polyethylene, and at least one low molecular weight component (LMW), preferably polyethylene. The term "bimodal," when used to describe the polyolefin, means "bimodal molecular weight distribution," which term is understood as having the broadest definition persons in the pertinent art have given that term as reflected in printed publications and issued patents. For example, a polyolefin with at least one identifiable high molecular weight distribution and polyolefins with at least one identifiable low molecular weight distribution is considered to be a "bimodal" polyolefin, as that term is used herein. Those high and low molecular weight polymers may be identified by deconvolution techniques known in the art to discern the two polymers from a broad or shouldered GPC curve of the bimodal polyolefins of the invention, and in another embodiment, the GPC curve of the bimodal polymers of the invention may display distinct peaks. An example of a deconvolution technique is described by E. Broyer and R. F. Abbott in *Analysis of Molecular Weight Distribution Using Multicomponent Models*, COMPUTER APPLICATIONS IN APPLIED POLYMER SCIENCE (1982), which describes a deconvolution method form bimodal polymers using a Weslau distribution.

In one embodiment, the polyolefin is a polyethylene copolymer, more particularly, a copolymer comprising at least 10 wt % ethylene derived units and units derived from one of an α-olefin selected from $C_3$ to $C_{12}$ α-olefins. The polyolefin is a poly(ethylene-co-1-butene) or a poly(ethylene-co-1-hexene) in another embodiment, preferably poly (ethylene-co-1-butene).

The polyolefins of the invention have a density in the range of 0.940 g/cm$^3$ to 0.980 g/cm$^3$ in one embodiment, in the range of from 0.945 g/cm$^3$ to 0.970 g/cm$^3$ in another embodiment, and in the range of from 0.948 g/cm$^3$ to 0.965 g/cm$^3$ in yet another embodiment, and in the range of from 0.950 g/cm$^3$ to 0.960 g/cm$^3$ in yet another embodiment, wherein a desirable density range of the polyethylene compositions of the invention comprise any combination of any upper density limit with any lower density limit described herein (Sample preparation method ASTM D4703-03; Density test method, gradient column per ASTM D1505-03).

The polyolefins of the present invention can be characterized by molecular weight characteristics such as measured by gel permeation chromatography (GPC). The polyolefins of the invention have an number average molecular weight (Mn) value of from 2,000 to 70,000 Daltons in one embodiment, and from 10,000 to 50,000 Daltons in another embodiment, and an weight average molecular weight (Mw) of from 50,000 to 2,000,000 Daltons in one embodiment, and from 70,000 to 1,000,000 Daltons in another embodiment, and from 80,000 to 800,000 Daltons in yet another embodiment. The polyolefins of the present invention may also have a z-average molecular weight (Mz) value ranging from greater than 200,000 Daltons in one embodiment, and from greater than 800,000 Daltons in another embodiment, and from greater than 900,000 Daltons in one embodiment, and from greater than 1,000,000 Daltons in one embodiment, and greater than 1,100,000 Daltons in another embodiment, and from greater than 1,200,000 Daltons in yet another embodiment, and from less than 1,500,000 Daltons in yet another embodiment; wherein a desirable range of Mn, Mw or Mz comprises any combination of any upper limit with any lower limit as described herein.

The polyolefins have a molecular weight distribution, a weight average molecular weight to number average molecular weight ($M_w/M_n$), or "Polydispersity index", of from greater than 30 or 40 in a preferable embodiment; and a range of from 30 to 250 in one embodiment, and from 35 to 220 in another embodiment, and from 40 to 200 in yet another embodiment, wherein a desirable embodiment comprises any combination of any upper limit with any lower limit described herein. The polyolefins also have a "z-average" molecular weight distribution ($M_z/M_w$) of from 2 to 20 in one embodiment, from 3 to 20 in another embodiment, and from 4 to 10 in another embodiment, and from 5 to 8 in yet another embodiment, and from 3 to 10 in yet another embodiment, wherein a desirable range may comprise any combination of any upper limit with any lower limit.

The polyolefins possess a melt index (MI, or $I_2$ as measured by ASTM-D-1238-E 190° C./2.16 kg) in the range from 0.01 dg/min to 50 dg/min in one embodiment, and from 0.02 dg/min to 10 dg/min in another embodiment, and from 0.03 dg/min to 2 dg/min in yet another embodiment, wherein a desirable range may comprise any upper limit with any lower limit described herein. The polyolefin of the invention possesses a flow index (FI or I21 as measured by ASTM-D-1238-F, 190° C./21.6 kg) ranging from 4 to 20 dg/min in one embodiment, and from 4 to 18 dg/min in another embodiment, and from 5 to 16 dg/min in yet another embodiment, and from 6 to 14 dg/min in yet another embodiment; and a range of from 6 to 12 dg/min in yet another embodiment, wherein a desirable I21 range may comprise any upper limit with any lower limit described herein. The polyolefins in certain embodiments have a melt index ratio ($I_{21}/I_2$) of from 80 to 400, and from 90 to 300 in another embodiment, and from 100 to 250 in yet another embodiment, and from 120 to 220 in yet another embodiment, wherein a desirable $I_{21}/I_2$ range may comprise any combination of any upper limit with any lower limit described herein.

Optionally, one or more additives may be blended with the polyolefin. With respect to the physical process of producing the blend of polyolefin and one or more additives, sufficient mixing should take place to assure that a uniform blend will be produced prior to conversion into a finished film product. One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means, preferably an extruder. Examples of suitable extruders include those made by Farrel™ and Kobe™. While not expected to influence the measured properties of the polyolefin compositions described herein, the density, rheological and other properties of the polyolefin compositions described in the Examples are measured after blending additives with the compositions.

Non-limiting examples of additives include fluoroelastomers, polyolefin glycols and polycaprolactones, antioxidants, nucleating agents, acid scavengers, plasticizers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide.

Fillers may be present in the polyolefin from 0.01 to 5 wt % in one embodiment, and from 0.1 to 2 wt % of the polyolefin in another embodiment, and from 0.2 to 1 wt % in yet another embodiment and most preferably, between 0.02 and 0.8 wt %. Desirable fillers include but not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, acetylene black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

In total, fillers, antioxidants and other such additives are preferably present to less than 2 wt % in the polyolefin compositions of the present invention, preferably less than 1 wt %, and most preferably to less than 0.8 wt % by weight of the total composition.

The resultant pelletized polyolefin, with or without additives, is processed by any suitable means for forming films: film blowing or casting and all methods of film formation to achieve, for example, uniaxial or biaxial orientation such as described in PLASTICS PROCESSING (Radian Corporation, Noyes Data Corp. 1986). In a particularly preferred embodiment, the polyolefin compositions of the present invention are formed into films such as described in the FILM EXTRUSION MANUAL, PROCESS, MATERIALS, PROPERTIES (TAPPI, 1992). Even more particularly, the films of the present invention are blown films, the process for which is described generally in FILM EXTRUSION MANUAL, PROCESS, MATERIALS, PROPERTIES pp. 16–29, for example.

As used herein, the term "film" or "films" includes skins, sheets, or membranes of a thickness of from less than 1000 μm, more preferably from less than 500 μm thickness, and even more preferably less than 200 μm, and most preferably from less than 100 μm, and includes films fabricated by any process known in the art such as by casting or blowing techniques—oriented or not—from an extruded or calendered, preferably extruded, polyethylene as defined herein, and the use of which can include any number of functions such as wrapping, protecting, packaging, bagging, coating, co-extrusion with other materials; and further, may have any commercially desirable dimensions of width, length, etc. The films of the present invention are not limited to transparent films, and may be opaque or translucent or transparent, preferably transparent, and have other properties as defined herein. The films of the present invention may be co-extruded with or otherwise secured to other sheets/structures, etc. to form structures of thickness greater than 1000 μm. In one embodiment, the film has a thickness of from 10 to 100 μm.

Any extruder suitable for extrusion of a high density polyethylene (HDPE) (density greater than 0.940 g/cm$^3$) operating under any desirable conditions for the polyolefin compositions described herein is particularly preferred to produce the films of the present invention. Such extruders are known to those skilled in the art. Such extruders include those having screw diameters ranging from 30 to 150 mm in one embodiment, and from 35 to 120 mm in another embodiment, and having an output of from 100 to 1,500 lbs/hr in one embodiment, and from 200 to 1,000 lbs/hr in another embodiment. In one embodiment, a grooved feed extruder is used. The extruder may possess an L/D ratio of from 80:1 to 2:1 in one embodiment, and from 60:1 to 6:1 in another embodiment, and from 40:1 to 12:1 in yet another embodiment, and from 30:1 to 16:1 in yet another embodiment.

A mono or multi-layer die can be used. In one embodiment a 50 to 200 mm monolayer die is used, and a 90 to 160 mm monolayer die in another embodiment, and a 100 to 140 mm monolayer die in yet another embodiment, the die having a nominal die gap ranging from 0.6 to 3 mm in one embodiment, and from 0.8 to 2 mm in another embodiment, and from 1 to 1.8 mm in yet another embodiment, wherein a desirable die can be described by any combination of any embodiment described herein. In a particular embodiment, the advantageous specific throughputs claimed herein are maintained in a 50 mm grooved feed extruder with an L/D of 21:1 in a particular embodiment.

For a cast-type die, typical dimensions are 100 to 500 or 1000 cm wide with a die gap of up to 2000 µm in one embodiment, and the die gap may range from 1 to 2000 µm in another embodiment, and may range from 10 to 1500 µm in yet another embodiment, and range from 25 to 1000 µm in yet another embodiment.

The temperature across the zones of the extruder, neck and adapter of the extruder ranges from 150° C. to 300° C. in one embodiment, and from 160° C. to 230° C. in another embodiment, and from 170° C. to 200° C. in yet another embodiment. The temperature across the die ranges from 160° C. to 300° C. in one embodiment, and from 170° C. to 250° C. in another embodiment, and from 180° C. to 230° C. in yet another embodiment.

The polyolefins of the invention are extruded by suitable means into a film having less than 200 gels/m$^2$ even more preferably less tan 200 gels/m$^2$, and even more preferably less than 50 gels/m$^2$, and even more preferably less than 30 gels/m$^2$, wherein the gels are measured according to the procedure described below. The "gel counts" referenced herein refer to the number of gels greater than 300 µm in size per square meter of a 25 µm film. Preferably, the films having this property can have a thickness of any desirable range known for films, ranging from 10 to 200 µm in one embodiment, and from 10 to 100 µm in a more preferably embodiment.

The polyolefin films possess other properties making them suitable for commercial use. For example, the films of the invention have an MD Tensile strength of from 9,000 to 15,000 psi and a TD Tensile strength of from 9,000 to 15,000 psi in one embodiment; and an MD Tensile elongation of from 200 to 350% and TD Tensile elongation of from 200 to 350% in another embodiment (ASTM D882-02), and an MD Elmendorf Tear value of from 10 to 30 g/mil in and a TD Elmendorf Tear value of from 20 to 60 g/mil in yet another embodiment (D1922-03a); and a dart impact ($F_{50}$) of greater than 150 g in one embodiment, and greater than 170 g in another embodiment (ASTM D1709-09).

The catalyst composition suitable for forming the polyolefins includes at least one catalyst component (or "catalyst compound"), and optionally at least one "primary activator". In one embodiment, the at least one catalyst component and optional primary activator is associated with a support material such as is known in the art to be "supported" thereon. Support materials and methods of supporting catalyst components are well known in the art.

Any catalyst component(s) suitable for producing polyolefins, or combination of catalyst components, can form part of the "catalyst composition". In one embodiment, the catalyst composition comprises a support and one or more catalyst compounds. The one or more catalyst compounds are selected from the group consisting of metallocenes, chromium compounds, vanadium-based catalyst compounds, Ziegler-Natta compounds, Group 4–10 coordination compounds, and combinations thereof. These catalysts are well known in the art. Group 4–10 coordination compounds are described by, for example, S. D. Ittel and L. K Johnson in 100 CHEM. REV. 1169–1203 (2000) and by G. J P. Britovsek, V C. Gibson and D. F. Wass in 38 ANGEW. CHEM. INT. ED. 428–447 (1999), and references cited therein, and U.S. Pat. No. 6,656,868. Metallocenes are well known in the art and include so-called mono-cyclopentadienyl metallocenes and bis-cyclopentadienyl, wherein the "cyclopentadienyl" includes species isolobal to cyclopentadienyl and substituted versions thereof. Metallocenes are described by G. G. Hlatky in 181 COORDINATION CHEM. REV. 243–296 (1999). Those particularly preferred are Group 4 bis-cyclopentadienyl-type metallocenes. Ziegler-Natta catalyst compounds are disclosed generally in ZIEGLER CATALYSTS 363–386 (G. Fink, R. Mulhaupt and H. H. Brintzinger, eds., Springer-Verlag 1995), and RE 33,683. Examples of such catalysts include those comprising Group 4, 5 or 6 transition metal oxides, alkoxides and halides, and more particularly oxides, alkoxides and halide compounds of titanium, zirconium or vanadium in combination with a magnesium compound, internal and/or external electron donors (alcohols, ethers, siloxanes, etc.), aluminum or boron alkyl and alkyl halides, and inorganic oxide supports.

In one embodiment, the catalyst composition comprises two catalyst compounds, any two types that are known in the art. In a particularly preferred embodiment, the one or more catalyst compounds comprise a metallocene and a Ziegler-Natta compound. In one embodiment, these catalyst compounds are associated with a support material and an activator ("primary activator").

Activators of polyolefin catalyst compounds are well known in the art and can include aluminum alkyls, alumoxanes, borate and borane compounds, and other species. The catalyst composition of the invention will preferably include at least one primary activator, most preferably an alumoxane. When present, the support material useful in the catalyst composition can be any suitable support material known in the art, and is preferably an inorganic oxide, and more preferably silica, and most preferably silica having an average particle size of from 5 to 60 µm, more preferably from 20 to 45 µm. Techniques such as Malvern™ measurement for determining the APS of supports, is well known in the art.

In one embodiment, the catalyst composition includes an alumoxane and a metallocene associated with a support material, preferably an inorganic oxide support material. In another embodiment, the catalyst composition includes an alumoxane and a Ziegler-Natta catalyst associated with a support material, preferably an inorganic oxide. In yet another embodiment, the catalyst composition includes a metallocene, a Ziegler-Natta catalyst and an alumoxane associated with a support material. Such a catalyst composition is described in, for example, U.S. Pat. No. 6,875,828.

Thus, the compositions and processes of the present invention can be described alternately by any of the embodiments disclosed herein, or a combination of any of the embodiments described herein. Embodiments of the invention, while not meant to be limiting by, may be better understood by reference to the following examples.

EXAMPLES

The following examples relate to gas phase polymerization procedures carried out in a fluidized bed reactor, utilizing ethylene and 1-hexene comonomer, resulting in production of polyolefin. The tables identify each run, along with the reported reaction conditions for each run. Various properties of the resulting product are also identified.

The fluidized bed was made up of polymer granules. During each run, the gaseous feed streams of ethylene and hydrogen were introduced before the reactor bed into a recycle gas line. The injections were downstream of the recycle line heat exchanger and compressor. Liquid 1-hexene comonomer was introduced before the reactor bed. Isopentane or hexane, if any, was added before the reactor bed into a recycle gas line in gaseous or liquid form; these are used as "condensing agents" as is known in the art. Trimethylaluminum (TMA) was added into the fluidized bed in gaseous or liquid form, except for specific tests identified in the examples. The individual flows of ethylene, hydrogen and hexene comonomer were controlled to maintain target reactor conditions. The concentrations of gases were measured by an on-line chromatograph, and reported in the tables.

In each run, supported bimetallic catalyst was injected directly into the fluidized bed using purified nitrogen. Catalyst injection rates were adjusted to maintain approximately constant production rate. In each run, the catalyst used was a bimetallic catalyst composition that included $TiCl_4$, an alkyl-magnesium, a metallocene compound $Cp_2MX_2$ wherein each Cp is an n-butyl substituted cyclopentadienyl ring, M is Zirconium, and X is fluoride, and methalumoxane, all supported on silica dehydrated at 875° C.

In particular, one method of making the bimetallic catalyst used in the Examples is as follows: silica support material, Davison Sylopol® 955 Silica was used. The silicas were dehydrated at a temperature of 875° C. Then, for each sample, the Ziegler-Natta ($TiCl_4$/alkyl-magnesium) catalyst is combined with the dehydrated silica. A 15 wt. % solution of dibutyl magnesium was added to a slurry of hexane and silica, followed by addition of butanol and allowed to react. Titanium tetrachloride was then added dropwise to the slurry.

The metallocene catalyst compound was then added to the sample of titanium tetrachloride-treated dehydrated silica. This was accomplished by first combining a 30 wt. % solution of methylaluminoxane (MAO) in toluene with the bis-n-butyl-cyclopentadienyl zirconium difluoride, and the mixture stirred until all of the solids were dissolved. Next, the MAO/Metallocene mixture was slowly added into the flask containing the previously prepared titanium reaction slurry over a period of about one hour. Toluene was used to wash the residual MAO/Metallocene mixture remaining in the flask into the flask containing the reaction slurry. The Al/Zr molar ratio (Al from MAO) may range from about 90 to 110; the Ti/Zr molar ratio ranged from 5 to 8.

During each run, the reacting bed of growing polymer particles was maintained in a fluidized state by a continuous flow of the make-up feed and recycle gas through the reaction zone. As indicated in the tables, each run utilized a target reactor temperatures ("Bed Temperature"), typically, a reactor temperature of about 203° F. or 95° C. During each run, reactor temperature was maintained at an approximately constant level by adjusting up or down the temperature of the recycle gas to accommodate any changes in the rate of heat generation due to the polymerization. Trimethyl aluminum is added to the reactor as an activator for the catalyst composition.

Example 1

Production of low-gel polymer with 2 wt % TMA feed to fluidized bed. Table 1, run 1 describes the reactor conditions and product results achieved with a solution of 2 wt % TMA in a diluent of hexane was fed directly into the fluidized bed. This run made good product at acceptable catalyst productivity and operability. The gel level in the granular product was measured to be 26.4 gels>300 $\mu m/m^2$ of film, and overall, the gel count was below about 30 gels for the entirety of the run when only the 2 wt % TMA was in use. The results are summarized graphically in FIG. 1. The measurement of the gels is described below in detail.

Example 2

Production of much-higher gel polymer when concentrated TMA was injected to recycle line. Table 1, run 2 shows average reactor conditions and product results while concentrated TMA was shot into the recycle line. For this demonstration, a solution of 50-wt % TMA in 1-hexene was used in this test. A 12" piece of ¼" tubing was used to hold the TMA solution. The tubing was fitted with two ¼" ball valves (one on each end) and pre-loaded in a lab drybox with 4.8 grams of solution. The test consisted of injecting the entire contents of the 12" tubing section of 50-wt % TMA in 1-hexene into the cycle gas piping into an existing ⅛" probe between the recycle compressor and the reactor inlet. 4.8 grams of the solution is equivalent to 20 minutes worth of TMA feed when the reactor is running 110-ppm (TMA/$C_2$ ratio) and 145 lb./hr $C_2$ feed. These were the reactor conditions just before the testing began. All other reactor feeds were held constant, including the water injection rate and the dilute TMA feed to the fluidized bed.

Figure 1:
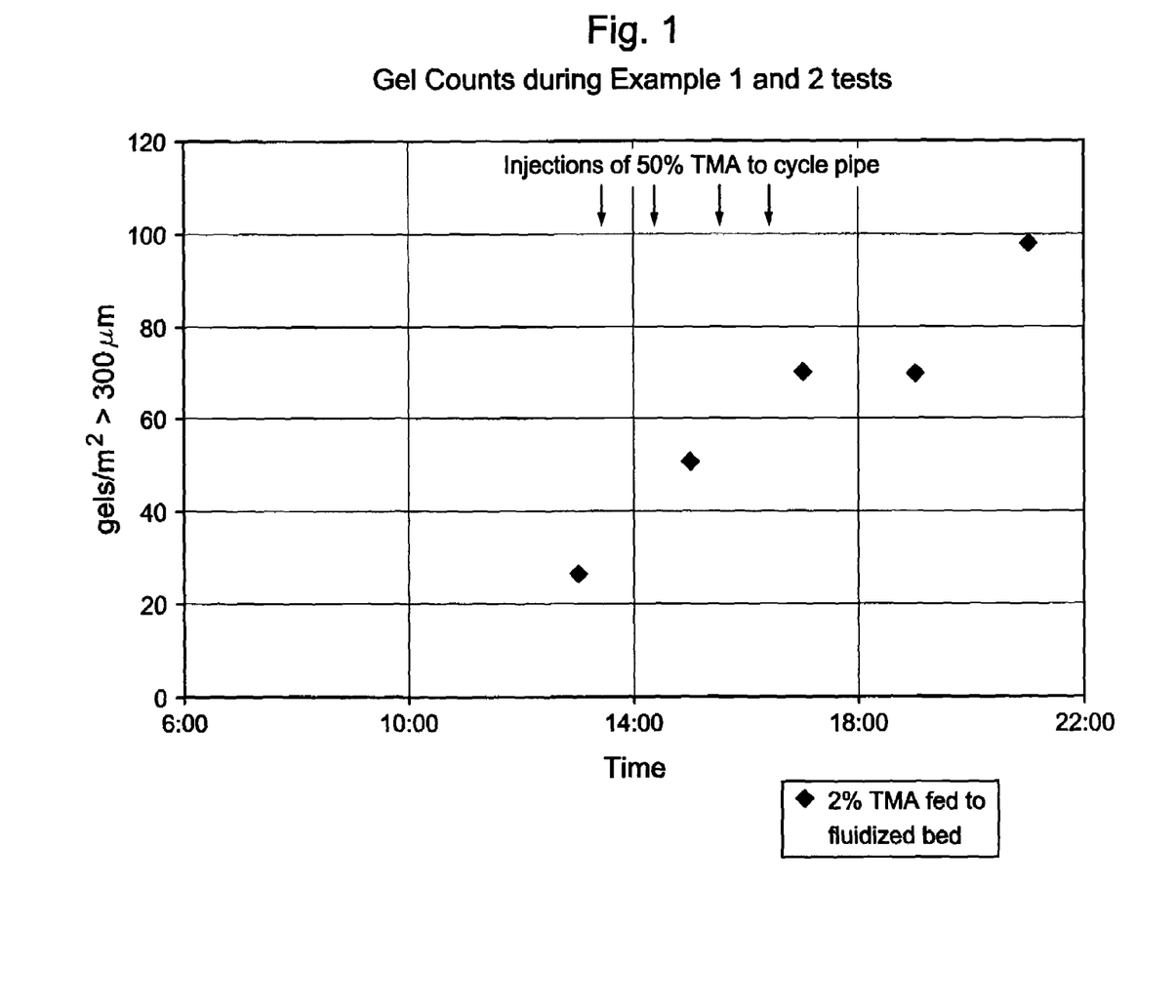
FIG. 1 is a graphical representation of the gel count of embodiments of the polyolefin as concentrated trimethylaluminum (TMA) activator is added to the reactor in "slugs".

The TMA solution was injected using 600-psi $N_2$. The $N_2$ flowed into the probe for approximately 2 minutes and then the $N_2$ was shut off and the solution was allowed to gravity feed into the cycle gas pipe for 10–20 minutes. After the wait, 3–8 lb./hr $iC_5$ feed was used for approximately 1 minute to mitigate the risk of residual TMA solution in the tubing catching fire when the tubing was removed. After the $iC_5$ flush, $N_2$ was used again to flush all the $iC_5$ out of the tubing (flowed for 30 seconds) after which, the tube was removed and the next tube was put in service. This was done four times on Day 1 at 13:22, 14:22, 15:28, 16:24. Resin samples, 20-lbs. each, were collected at 13:00, 15:00, 17:00, 19:00 and 21:00 to be evaluated for gel levels. FIG. 1 shows gel measurements from these samples and Table 2 gives the detailed gel count data. Gel counts increased substantially during and after times the concentrated TMA entered the reactor.

Each time the concentrated TMA solution was shot into the reactor, the reactor rates would slightly decrease. Reactor rate is estimated by tracking the "reactor bed activity." The reactor bed activity is calculated by subtracting the inlet gas temperature from the bed temperature. It was observed that after each TMA shot, the bed activity temporarily lost 0.5 to 1.5° F. This corresponds to a production rate decrease of about 5%. This was an indication that the TMA shot was indeed making it into the reactor. All other reactor variables were kept constant during the test. All thermocouple readings, static and reactor concentrations were stable.

Gel Measurements

The measurements of "gels" or "gel count", as referenced throughout the present specification, was performed as described herein. The testing conducted Southern Analytical, Inc. 19407 Oil Center Boulevard Houston, Tex. 77073 281-591-0800 Fax: 281-591-0052. The equipment used consisted of an Optical Control Systems GmbH (OCS) Model ME-20 extruder, and OCS Model CR-8 cast film system, and an OCS Model FS-5 gel counter.

The ME-20 extruder consists of a 3/4" standard screw with 3/1 compression ratio, and 25/1 L/D. It includes a feed zone, a compression zone, and a metering zone. The extruder utilizes all solid state controls, a variable frequency AC drive for the screw, 5 heating zones including 3 for the barrel, 1 for the melt temperature and pressure measurement zone, and one for the die. The die is a 4" fixed lip die of a "fishtail" design, with a die gap of approx. 20 mils.

The cast film system includes dual stainless steel chrome plated and polished chill rolls, a machined precision air knife, rubber nip rolls that pull the film through the gel counter, and a torque driven wind up roll. The nip rolls are driven separately from the chill rolls and are controlled by speed or tension. A circulation cooling/heating system for the chill rolls is also included, and utilizes ethylene glycol. Steel SS rails, film break sensors, and other items are included.

The gel counter consists of a digital 2048 pixel line camera, a halogen based line lighting system, an image processing computer, and Windows NT4 software. The camera/light system is mounted on the cast film system between the chill roll and nip rolls, and is set up for a 50-micron resolution on film. This means that the smallest defect that can be seen is 50 microns by 50 microns in size. The OCS cast film system is designed to provide the highest quality and most consistent film possible for the gel measurement.

Set up conditions. The pellet samples were run with constant extruder temperatures (180° C. for the feed zone, 190° C. for all remaining zones), and constant chill roll temperature of 40° C. The extruder and chill roll speeds had to be varied somewhat between samples to provide an optimum film for each sample.

The gel counter was set up with 10 different size classes beginning at 50–100 $\mu$m and increasing at 100 $\mu$m intervals, 4 different shape classes beginning with a perfect circular shape and increasing to more oblong shapes, and two detection levels (one for gels and one for black specks). The gel detection level or sensitivity used is normally between was set to 35.

Gel Test Procedure. Once the camera set up parameters were determined, the extruder was purged with the first sample (typically about 20 minutes) or until it was apparent that the test conditions were at steady state, or "equilibrium". This was done by looking at a trend line chart of gel count number on the "y" axis, and time on the "x" axis. Tests were then run on 4–9 square meters of film of 25 $\mu$m gauge. Results are reported as the total number of gels/m$^2$ of a specified size range; as stated throughout the specification, the default size range is gels greater than 300 $\mu$m in size.

It will be understood by those skilled in the art that the "gel count" as referred to herein is a characterizing feature of the films as that measurement is described; the "film" itself is not limited to the dimensions, thickness, method of extruding, etc., that is required to measure the "gel count" as described.

TABLE 1

Process and PE Product data for Examples 1 and 2.

| Run number | 1 | 2 |
|---|---|---|
| Process average end time | 03:00 to 13:00 | 14:00 to 23:00 |
| Description | Dilute TMA to bed | Added 50% TMA to cycle pipe |
| TMA feed rate to bed (wt ppm based on ethylene feed) | 110 | 110 |
| $H_2O/C_2$ (wt ppm based on ethylene feed rate) | 25.04 | 25.50 |
| Residence Time (hrs) | 6.14 | 6.14 |
| Ethylene ($C_2$) Partial Pressure (psia) | 195 | 193 |
| $H_2/C_2$ measured Ratio (mole/mole) | 0.0097 | 0.0091 |
| Hexene/Ethylene ($C_6/C_2$) measured Ratio (mole/mole) | 0.0105 | 0.0104 |
| $H_2/C_2$ Flow Ratio (milli-lb/lb) | 0.0818 | 0.0889 |
| $C_6/C_2$ Flow Ratio (lb/lb) | 0.020 | 0.020 |
| $N_2$ Concentration in cycle gas (mole fraction) | 0.313 | 0.314 |
| Reactor Pressure (psig) | 300 | 300 |
| Bed Temperature (° C.) | 95.0 | 95.0 |
| Fluidization Gas Velocity (ft/sec) | 1.90 | 1.90 |
| Catalyst Productivity (lb PE/lb catalyst) | 7339 | 7538 |
| PE polymer composition | | |
| $I_{21}$ (dg/min) | 7.79 | 7.09 |
| $I_{21}/I_2$ | 94.2 | 87.6 |
| Density (g/cm$^3$) | 0.9496 | 0.9486 |
| Average number of gels > 300 $\mu$m/m$^2$ | 26.4 | 72.1 |

TABLE 2

Gel count data for Examples 1 and 2.

| Batch No. | Time | Total Gels > 300 $\mu$m | Gauge, $\mu$m | Total area, m$^2$ | <99 $\mu$m* | 100–199 $\mu$m | 200–299 $\mu$m | 300–399 $\mu$m | 400–499 $\mu$m | 500–599 $\mu$m | 600–699 $\mu$m | 700–799 $\mu$m | 800–899 $\mu$m | 900–999 $\mu$m |
|---|---|---|---|---|---|---|---|---|---|---|---|---|---|---|
| 001 | 13:00 | 26.4 | 25 | 5.00 | 102 | 136 | 103 | 60 | 31 | 18 | 5 | 8 | 3 | 7 |
| 002 | 15:00 | 50.6 | 25 | 5.00 | 88 | 152 | 129 | 76 | 68 | 29 | 30 | 5 | 27 | 18 |
| 003 | 17:00 | 70 | 25 | 5.00 | 118 | 154 | 131 | 119 | 62 | 47 | 25 | 19 | 12 | 66 |
| 004 | 19:00 | 69.8 | 25 | 5.00 | 130 | 175 | 196 | 134 | 96 | 53 | 27 | 17 | 4 | 18 |
| 005 | 21:00 | 98 | 25 | 5.00 | 251 | 260 | 215 | 120 | 101 | 70 | 44 | 34 | 26 | 95 |

*For example, this is the total gel count less than 99 microns.

Note that high concentration slugs of TMA were added to the reactor starting at 13:22, and after that point, further slugs were added to the reactor. Even after one slug, the number of gels increases.

During polymerization operations using an activator that is at a concentration of less than 50 wt %, in this particular case, 2 wt % in hexane, it can be seen that the gel count for the films produced therefrom are low, less than 50 gels/m$^2$. As can be seen graphically in FIG. 1, once slugs of activator, in this case TMA, are added to the reactor to increase the overall concentration of activator, gels begin to form in the films. The more TMA is added in concentrated amounts, the more gels appear in the films. The Applicant's have found that by maintaining a relatively dilute solution of activator that is injected into the reactor, the presence of gels in the films produced therefrom can be greatly reduced or eliminated.

In one embodiment, the method of forming films described herein includes eliminating the injection of activators at concentrations higher than 50 wt % by weight of the activator and diluent, and higher than 40 wt % in another embodiment, and higher than 10.5 wt % in yet another embodiment.

Thus, one aspect the invention can be described as a method of forming a film comprising combining in a reactor olefins, a catalyst composition and an activator ("secondary activator"); wherein the activator is present from less than 50 wt % in a diluent by weight of the activator and diluent; followed by isolating a polyolefin having a density of from 0.940 to 0.980 g/cm$^3$; and extruding the polyolefin into a film having less than 200 gels/m$^2$. These steps may be carried out simultaneously and in a continuous manner, that is, one step does not have to end before another begins. For example, in a continuous slurry, solution or gas phase polymerization process, the "combining" step can take place with polyolefin is "isolated" continuously, and further, "extrusion" can also take place during these steps as well. The extrusion step can be carried out at any time or location with respect to the previous steps, that is, the polyolefin can be isolated then stored for some time before extrusion to form the film, and further, the extrusion can take place in a location near one or more of the "contacting" and "isolating" steps, or far removed to any location.

In one embodiment of the method, the activator is present from 0.05 to 40 wt % in a diluent by weight of the activator and diluent, and from 0.05 to 10.5 wt % in yet another embodiment.

In another embodiment of the method, the diluent is selected from the group consisting of $C_3$ to $C_{20}$ alkanes, $C_3$ to $C_{20}$ alkenes and combinations thereof.

In yet another embodiment of the method, the catalyst composition comprises a support and one or more catalyst compounds.

In yet another embodiment of the method, the one or more catalyst compounds are selected from the group consisting of metallocenes, chromium compounds, Ziegler-Natta compounds, Group 4–10 coordination compounds, and combinations thereof.

In yet another embodiment of the method, the one or more catalyst compounds comprise two catalyst compounds.

In yet another embodiment of the method, the one or more catalyst compounds comprise a metallocene and a Ziegler-Natta compound; and wherein these catalyst compounds are associated with a support material and an alumoxane.

In yet another embodiment of the method, the reactor is a gas phase fluidized bed reactor.

In yet another embodiment of the method, the fluidized bed reactor having a recycle gas inlet and a cycle gas outlet; wherein the activator is first placed in the recycle gas inlet prior to contacting with the olefins and catalyst composition.

In yet another embodiment of the method, the fluidized bed reactor having a fluidized bed of polyolefin, wherein the activator is placed directly into the bed.

In yet another embodiment of the method, the olefins comprise ethylene and α-olefins selected from the group consisting if $C_3$ to $C_{12}$ α-olefins and combinations thereof.

In yet another embodiment of the method, the polyolefin is a bimodal polyolefin copolymer.

In another embodiment of the method, the polyolefin that is isolated has a density of from 0.945 to 0.965 g/cm$^3$.

In yet another embodiment of the method, a film is extruded having a gel count less than 100 gels/m$^2$.

In yet another embodiment of the method, the activator is selected from the group consisting of compounds having the formula $R_3M'$, wherein M' is a Group 13 metal atom, and each R is independently selected from halides, hydride, $C_1$ to $C_{10}$ alkyls, $C_1$ to $C_{10}$ alkoxys, $C_5$ to $C_{24}$ aryls, $C_5$ to $C_{24}$ aryloxys and combinations thereof.

In yet another embodiment of the method, the activator is maintained in the reactor at a concentration of from 25 to 350 wt ppm.

The invention also includes a film made by of any of the preceding embodiments.

Another aspect of the invention is to a polyethylene film having a gel count of less than 200 gels/m$^2$ and a density of 0.940 to 0.980 g/cm$^3$; characterized in that the polyethylene is produced by combining olefins, a catalyst composition and an activator in a reactor; wherein the activator is present from less than 50 wt % in a diluent by weight of the activator and diluent. The film thus described can be further described by any one or more or combination of the embodiments described herein.

Another aspect of the invention is to the use of a polyethylene film having a gel count of less than 200 gels/m$^2$ and a density of 0.940 to 0.980 g/cm$^3$; characterized in that the polyethylene is produced by combining olefins, a catalyst composition and an activator in a reactor; wherein the activator is present from less than 50 wt % in a diluent by weight of the activator and diluent. The film thus described can be further described by any one or more or combination of the embodiments described herein.

Any embodiment of the method may be combined with any other embodiment described above as is apparent from the description as a whole and the claims herein.

We claim:

1. A method of forming a film comprising:
    (a) combining in a reactor olefins, a catalyst composition and an activator; wherein the activator is present from less than 50 wt % in a diluent by weight of the activator and diluent;
    (b) isolating a polyolefin having a density of from 0.940 to 0.980 g/cm$^3$; and
    (c) extruding the polyolefin into a film having a gel count of less than 200 gels/m$^2$.

2. The method of claim 1, wherein the activator is present from 0.05 to 40 wt % in a diluent by weight of the activator and diluent.

3. The method of claim 1, wherein the activator is present from 0.05 to 10.5 wt % in a diluent by weight of the activator and diluent.

4. The method of claim 1, wherein the diluent is selected from the group consisting of $C_3$ to $C_{20}$ alkanes, $C_3$ to $C_{20}$ alkenes and combinations thereof.

5. The method of claim 1, wherein the catalyst composition comprises a support and one or more catalyst compounds.

6. The method of claim 5, wherein the one or more catalyst compounds are selected from the group consisting of metallocenes, chromium compounds, Ziegler-Natta compounds, Group 4–10 coordination compounds, and combinations thereof.

7. The method of claim 5, wherein the one or more catalyst compounds comprise two catalyst compounds.

8. The method of claim 5, wherein the one or more catalyst compounds comprise a metallocene and a Ziegler-Natta compound; and wherein these catalyst compounds are associated with a support material and an alumoxane.

9. The method of claim 1, wherein the reactor is a gas phase fluidized bed reactor.

10. The method of claim 9, the fluidized bed reactor having a recycle line inlet and a cycle line outlet; wherein the activator is first placed in the recycle line inlet prior to contacting with the olefins and catalyst composition.

11. The method of claim 9, the fluidized bed reactor having a fluidized bed of polyolefin, wherein the activator is placed directly into the bed.

12. The method of claim 1, wherein the olefins comprise ethylene and α-olefins selected from the group consisting if $C_3$ to $C_{12}$ α-olefins and combinations thereof.

13. The method of claim 12, wherein the polyolefin is a bimodal polyolefin copolymer.

14. The method of claim 13, wherein the polyolefin that is isolated has a density of from 0.945 to 0.965 g/cm$^3$.

15. The method of claim 1, wherein a film is extruded having less than 100 gels/m$^2$.

16. The method of claim 1, wherein the activator is selected from the group consisting of compounds having the formula $R_3M'$, wherein M' is a Group 13 metal atom, and each R is independently selected from halides, hydride, $C_1$ to $C_{10}$ alkyls, $C_1$ to $C_{10}$ alkoxys, $C_5$ to $C_{24}$ aryls, $C_5$ to $C_{24}$ aryloxys and combinations thereof.

17. The method of claim 1, wherein the activator is maintained in the reactor at a concentration of from 25 to 350 wt ppm.

18. The method of claim 5, wherein the support comprises silica having an average particle size of from 5 to 50 µm.

* * * * *